May 23, 1944.  J. M. EDMUND  2,349,253
PACKING ARRANGEMENT
Filed Jan. 30, 1943
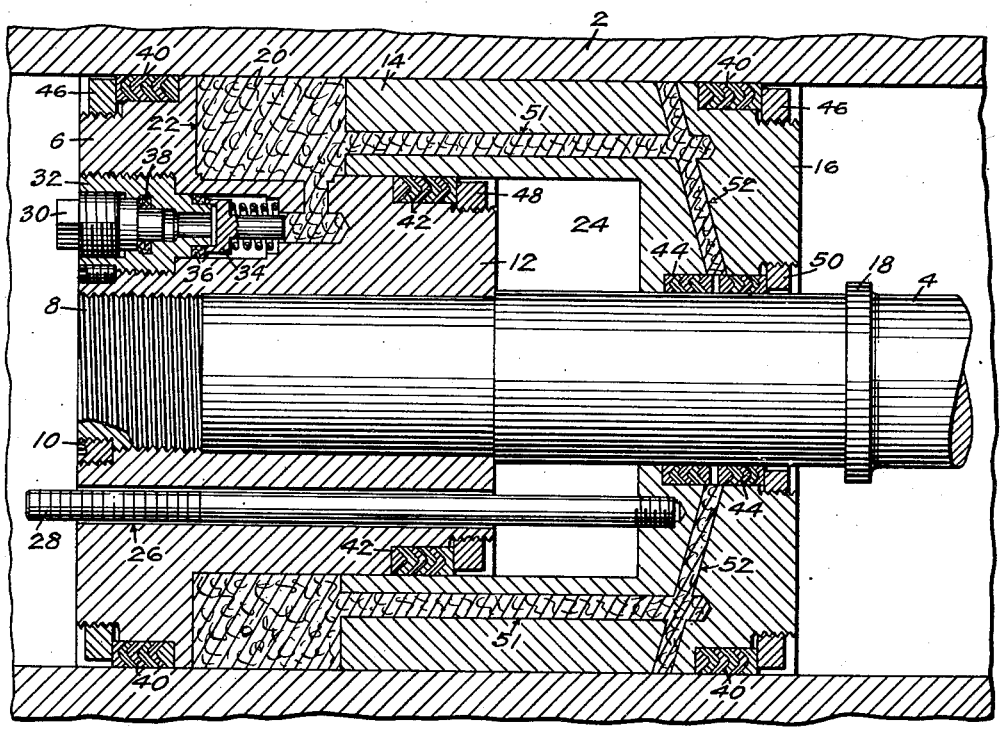
Inventor
James M. Edmund
By C. E. Herrstrom & H. E. Thibodeau
Attorneys Patented May 23, 1944

2,349,253

UNITED STATES PATENT OFFICE 2,349,253

PACKING ARRANGEMENT

James M. Edmund, Washington, D. C.

Application January 30, 1943, Serial No. 474,212

3 Claims. (Cl. 309—23)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a fluid tight seal for two parts that have relative movement, particularly to a seal for a recuperator cylinder piston such as used in the recoil mechanism of ordnance.

The conventional type of recuperator piston packing has been found to be effective in limiting loss of lubricant, but has not been entirely satisfactory in preventing "blow-by" of the gas used in the recuperator cylinder. Loss of this gas eventually necessitates servicing of the gun, and the faster the gas leaks out, of course, the more the piece is out of action. It is therefore desirable to keep the gas leak to a minimum.

It is the principal object of this invention to provide a substantially gas tight seal on a recuperator piston. It will of course be understood that its application is not so limited. The object is accomplished by the use of a two part piston forming a pocket between the parts. The pocket is bounded by the piston parts and the chamber wall. A sealing fluid such as a grease or oil fills the pocket. The piston part in contact with the recuperator cylinder gas presents a greater area to the gas than to the sealing fluid, resulting in a higher unit pressure on the fluid than on the gas. Thus the gas is prevented from blowing the sealing fluid out from between the piston and the chamber wall. A telltale secured to one piston part and extending through the other part indicates when so much of the sealing fluid has been lost as to require replacing. For that purpose, a filler plug is provided in one piston part.

The sole figure of the drawing shows a longitudinal center section through the preferred embodiment of the invention.

Referring to the drawing in detail, a recuperator cylinder or other fluid pressure chamber 2 is shown. A piston rod 4 is mounted for reciprocation in the cylinder. A first part 6 of a piston is secured to the rod as by the threaded connection 8 and locking screw 10. A projecting boss 12 is provided on piston part 6. The boss forms with the chamber wall an annular space into which fits an annular ring 14 of a second piston part 16. The part 16 has a limited amount of reciprocating movement relatively to the part 6. The limit in one direction is provided by a collar 18 on rod 4; movement in the other direction is limited by compression of a sealing fluid 20 (oil or grease) in the pocket 22 which is bounded by the two piston parts and the chamber wall.

A space 24 substantially at the piston center is defined by the two interfitting piston parts. The space is vented to atmosphere by means of an opening 26 through the part 6. An indicator or "telltale" 28 screwed into the part 16 extends through the opening 26 to warn the gunner when the space 22 must be refilled with sealing fluid. For this purpose, a filler plug 30 screwed into replaceable wear plug 32 may be provided. A spring biased check valve 34 and suitable oil seals 36 and 38 are also a part of the preferred embodiment.

To reduce the loss of sealing fluid to a minimum, the piston parts are provided with any suitable packing as shown at 40, 42, and 44. The packing is held in place by removable rings 46, 48, and 50, respectively. Fluid passages 51 and 52 spaced about through piston part 16 insure the supply of sealing fluid to the various surfaces of that part in sliding contact with other surfaces. The packing 40, 42, and 44 is preferably of the type known as Garlock chevron packing.

*Operation.*—During recoil of the gun, rod 4 carries the piston to the right, compressing the gas in chamber 2. The piston part 16 is in direct contact with the gas, and is forced by gas pressure to compress against the fluid 20 in pocket 22. But since the area exposed to the gas is larger than the area exposed to the sealing fluid, the fluid will be under a higher unit pressure than the gas in the chamber. The fluid will thus be better able to resist being blown out by the gas. By "exposed area" is meant of course the effective area against which the fluid acts. This area is the projected area of the exposed surface, or the area of the surface projected onto a plane perpendicular to the direction of motion of the piston. For the plane surfaces shown, this area is the same as that of the actual surfaces.

Some sealing fluid will doubtless be lost. As the quantity of fluid in pocket 22 decreases, the piston parts will come closer together exposing more and more of the end of telltale 28, which can be so marked as to indicate to a gunner when the sealing fluid should be replenished.

I claim:

1. In a fluid tight seal, a pressure cylinder, a two part reciprocable piston whose parts are spaced from each other and movable relative to each other, and forming a pocket between them, a sealing fluid in said pocket under higher unit pressure than the fluid being sealed, means for venting the space between the piston parts other than the pocket to the atmosphere, including an opening through one part not in direct contact with the fluid to be sealed, and an indicator extending through said opening, the indicator being secured to the part in direct contact with the fluid to be sealed.

2. An elongated fluid pressure chamber, a two part piston reciprocable in the chamber and having one part in direct contact with the fluid to be compressed, the two parts of the piston being movable relatively to each other and forming a pocket between them at the periphery of the piston and a space at the piston center, and a sealing fluid in the pocket, said sealing fluid being under a higher unit pressure than the fluid being compressed, a vent to the atmosphere for the space at the piston center, comprising an opening through the piston part not in direct contact with the fluid being compressed, and an indicator on the other piston part and extending through the opening.

3. In combination, an elongated fluid pressure chamber, a piston rod reciprocable in the pressure chamber, a piston part secured to the piston rod and being in contact with the chamber wall, a projecting boss on the piston part and defining an annular space between the boss and the chamber wall, a second piston part in contact with the chamber wall and mounted for limited reciprocation relative to the rod, an annular ring on the second piston part cooperable with the boss of the first piston part to form an annular pocket bounded by the piston parts and the chamber wall, and a sealing fluid in the pocket, and passages in the second piston part communicating the pocket with the outer surface of the piston part.

JAMES M. EDMUND.